(No Model.)
A. S. PETTICREW.
AUTOMATIC RECEDING SAWMILL SET WORKS.
No. 537,902. Patented Apr. 23, 1895.
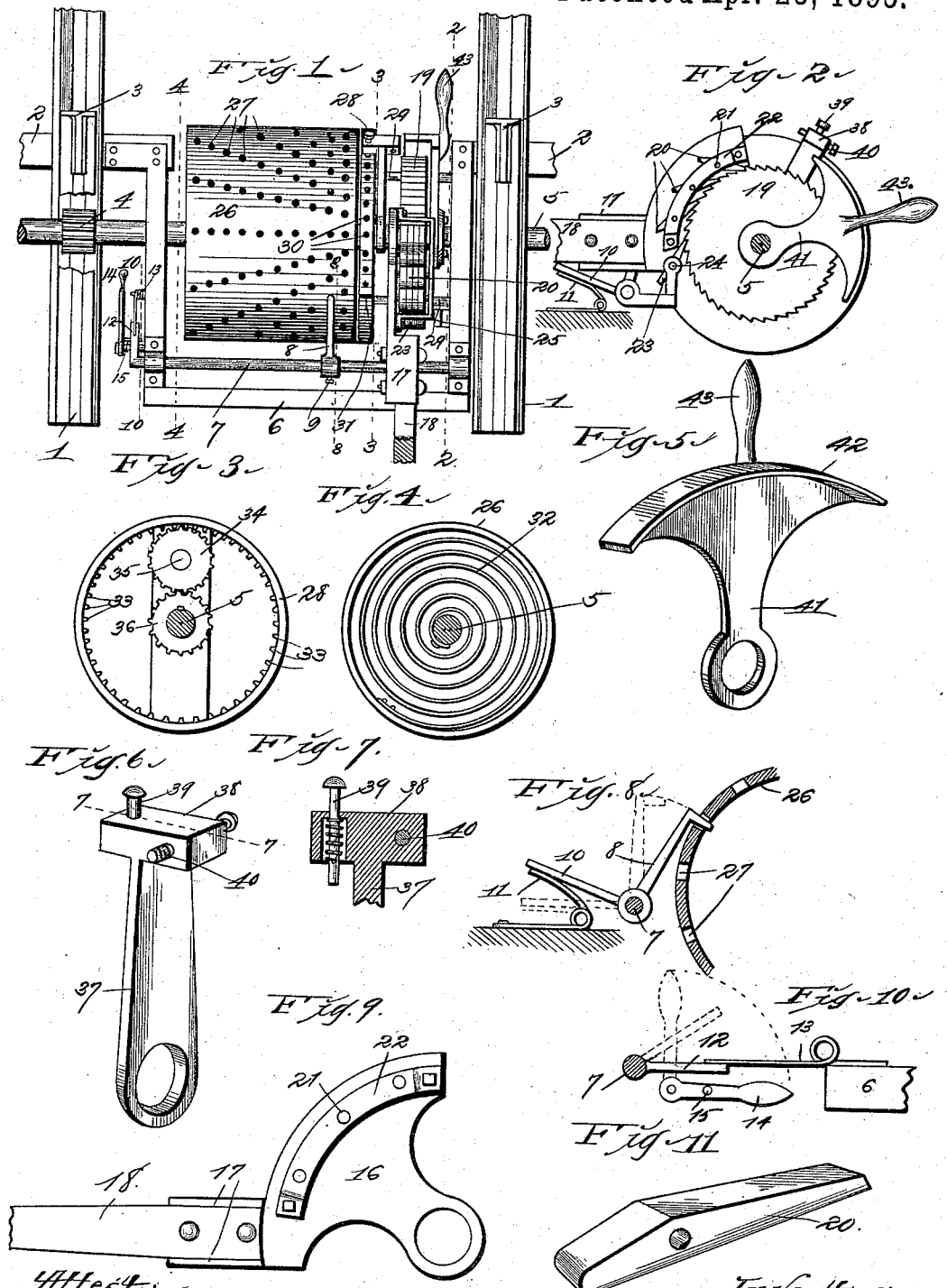

UNITED STATES PATENT OFFICE.

ALGERNON S. PETTICREW, OF ST. LOUIS, MISSOURI.

AUTOMATIC RECEDING SAWMILL SET-WORKS.

SPECIFICATION forming part of Letters Patent No. 537,902, dated April 23, 1895.

Application filed August 6, 1894. Serial No. 519,522. (No model.) Patented in Canada September 1, 1894, No. 46,918.

*To all whom it may concern:*

Be it known that I, ALGERNON S. PETTICREW, of the city of St. Louis, State of Missouri, have invented certain new and useful Improvements in Automatic Receding Sawmill Set-Works, of which the following is a full, clear, and exact description, reference being had to the accompanying drawings, forming a part hereof.

This invention was patented in Canada on September 1, 1894, No. 46,918.

My invention relates to improvements in the automatic receding sawmill set-works, shown and described in my prior United States Patent No. 502,316, dated August 1, 1893, and consists in the novel construction, combination and arrangement of parts, hereinafter specified and designated in the claim.

Referring to the drawings: Figure 1 is a top plan view of my complete invention. Fig. 2 is a vertical sectional view taken on the line 2—2 of Fig. 1. Fig. 3 is a vertical sectional view taken on the line 3—3 of Fig. 1. Fig. 4 is a vertical sectional view taken on the line 4—4 of Fig. 1. Fig. 5 is a view in perspective of a pawl-tripping device comprising a portion of my invention. Fig. 6 is a view in perspective of an adjusting arm and stop. Fig. 7 is a sectional view on the line 7—7 of Fig. 6. Fig. 8 is a sectional view on the line 8—8 of Fig. 1 looking toward the right-hand therein. Fig. 9 is a side elevation of a segmental plate that carries a series of pawls, also a lever for operating same. Fig. 10 is a sectional view on the line 10—10 of Fig. 1 looking toward the left-hand therein. Fig. 11 is a view in perspective of one of the pawls of which I make use in carrying out my invention.

Referring by numerals to the accompanying drawings, 1 indicates guide-ways for the knee-blocks, which guide-ways are made after the usual construction and are so formed that the base of the knee-blocks is free to move backward and forward in said guide-ways. These guide-ways are suitably mounted upon a carriage frame 2.

3 indicates the knee-blocks proper, the bases of which are provided with cogs or teeth which are adapted to mesh with pinions 4 mounted upon a set-shaft 5. Said set-shaft is suitably and mechanically mounted upon the guide-ways 1 and is adapted to freely move in its appropriate bearings therein. When the set-shaft 5 is rotated, it imparts motion to the pinions 4 and said pinions impart motion to the knee-blocks 3. 6 indicates a frame work in which the said set-shaft 5 also has its bearings, said frame work also providing protection for mechanism mounted and partially inclosed in the same.

7 indicates a bar or shaft which is suitably mounted in bearings upon the frame work 6. Secured to the shaft 7 is an adjustable dog or pawl 8, which has the function of holding the drum and the set-works in any desired position. This dog or pawl is adjustable upon the length of the shaft 7, and it is held in a rigid position wherever desired by means of a set-screw 9.

Rigidly fixed upon the shaft 7 at a point near the right-hand end thereof beneath the main-lever is an arm 10, the same bearing directly upon one end of a spring 11, said spring being secured to the frame work 6. Upon the outer end of the shaft 7 is an additional arm 12, the end of which is engaged by a spring 13, the same being secured to the outside of the frame work 6. Pivoted to the outside of said frame work 6, immediately below the arm 12, is a lever 14, the same being provided with a pin 15. When this lever 14 is raised, the pin 15 engages against the lower side of the arm 12, thereby raising the same which necessarily partially rotates the shaft 7, thus raising the point of the dog or pawl 8 away from the drum.

The functions of the springs 11 and 13 are to hold the dog or pawl 8 in engagement with the periphery of the drum. This will be more fully hereinafter described.

16 indicates a segmental lever, the same being loosely mounted upon the set-shaft 5. The outer lower end of this segmental lever is provided with ears or flanges 17, between which is bolted an arm or lever 18. Rigidly mounted upon the set-shaft 5, adjacent the segmental lever 16, is a ratchet-wheel 19.

20 indicates pawls, a plurality of which are mounted upon shafts 21, the ends of said shafts 21 bearing in the segmental lever 16 and a segmental plate 22, the same being bolted to the segmental lever. A series of pawls 23 is mounted upon a shaft 24, said shaft 24 being mounted in bearings 25 secured to the frame 6.

26 indicates a drum which is provided throughout its entire width and circumference with perforations 27 in which the point of the dog or pawl 8 is adapted to engage. These perforations are arranged around the circumference of said drum in series and in parallel lines. The perforations of the first line to the right are much closer together than those of the adjacent lines, which are arranged across the width of the drum.

28 indicates a stationary head, the same being rigidly positioned by means of bolts 29 extending to the frame work 6. A portion of this head 28 is provided with a series of apertures 30, also an indicating mark 31. By means of these apertures 30 and the apertures 27 in the drum 26, the width of the planks to be sawed is adjusted.

32 indicates a convolute spring which is located on the inside of the drum 26, one end of said spring being rigidly secured to the set-shaft 5, the other end thereof being rigidly secured to the inner face of the drum, or to any portion of the frame work. The object of this spring is to rotate the drum in a reverse direction, and, consequently, recede the set-works. The end of the drum opposite to the one in which the spring 32 is located, is provided on its inner face with a series of teeth or cogs 33, said cogs being adapted to mesh with the teeth of a pinion 34 mounted upon a stud 35, said stud projecting from a cross-bar of the stationary head 28. This pinion 34 also meshes with a pinion 36 which is rigidly secured or keyed to the set-shaft 5.

Loosely mounted upon the set-shaft 5, between the head 28 and the segmental lever 16, is an arm 37, the same being provided with a rectangular head 38 in which there is a spring-actuated vertically moving pin 39.

Extending longitudinally through the head 28 is a screw-threaded bolt 40. The forward end of this bolt 40 is adapted to form a stop for the forward movement of the segmental lever 16, and the lower end of the spring-actuated pin 39 is adapted to enter any one of the series of perforations 30 in the stationary head 28.

Loosely mounted upon the set-shaft 5, outside the ratchet-wheel 19, is a segmental pawl-trip 41, the same being provided with a segmental flange 42 extending over the teeth of the ratchet-wheel 19 and adapted to contact and engage against the rear ends of the pawls 20. This pawl-trip 41 is also provided with an operating handle 43.

If desired, a shaft such as 7, together with its arms, springs, &c., may be positioned on the opposite side from where the single shaft 7 now lies. When this is done, an arm must extend from the segmental lever 16 to contact and engage against an arm on the shaft 7 in order to disengage the pawl 8 of said shaft from the perforations 27 in the drum 26.

The operation is as follows: When the operator desires to advance the knee-blocks 3, he bears or presses down upon the hand lever 18 and brings it into sufficient contact with the arm 10 to trip or disengage the pawl. After he has effected this disengagement, the lever 18 is raised which causes the pawls 20 on the segmental lever 16 to engage with the teeth of the ratchet-wheel 19, thereby imparting motion to said ratchet-wheel. Said wheel being rigidly secured to the set-shaft 5 will impart motion to said shaft, and said shaft will communicate its motion to the pinions 4, thereby moving the knee-block forward, which, in turn, will push the log forward. The set-shaft so rotated also imparts motion to the pinion 36, which, in turn, imparts motion to the pinion 34, thereby rotating the drum 26. When said drum has been rotated to the extent desired by the operator, the point of the pawl 8 automatically engages with one of the perforations formed in the drum 26. The forward motion of the knee-blocks can be repeated and carried as far as the dimensions of the mechanism will permit. However, when it is desired to recede the knee-blocks, or move them rearwardly, the pawl 8 is disengaged by pressing downwardly upon the hand-lever 18 until it contacts with the arm 10, thereby slightly rotating the shaft 7, thus disengaging the point of the pawl 8 from the perforated drum. The resiliency of the convolute spring 32 will rotate the drum and shaft, together with the knee-blocks, in a rearward direction without the aid of any other mechanism. By grasping the handle 43 of the pawl-trip and moving the same forward, the flange 42 will engage with the rear ends of the pawls 20 and 23, thereby disengaging the same from the teeth of the ratchet-wheel 19. By positioning the pin 39 in the perforation 30 of the stationary head 28, and the positioning of the screw 40 in the head 38, perfect adjustment for the limit of movement of the lever 18 may be obtained.

Thus it will be seen how I have constructed an automatic receding sawmill set-work that possesses superior advantages in point of simplicity, durability and general efficiency.

What I claim is—

In a device of the class described, the combination of a segmental lever, a series of pawls each mounted on said lever on the same pin or bolt, another series of pawls mounted all on another pin or bolt and carried by the same lever, a separate series of pawls mounted on a stationary pin or bolt, a suitable reversing spring, a segmental pawl-trip provided with an outwardly projecting flange and handle, said outwardly projecting flange adapted to engage upon the rear ends of the stationary and moving pawls, thereby disengaging the points of the pawls from the ratchet-wheel and allowing the wheel to reverse its motion.

In testimony whereof I affix my signature in presence of two witnesses.

ALGERNON S. PETTICREW.

Witnesses:
JNO. C. HIGDON,
J. E. LOVE.